United States Patent
Ko et al.

(10) Patent No.: US 11,167,651 B2
(45) Date of Patent: Nov. 9, 2021

(54) METHOD OF CONTROLLING VIBRATION REDUCTION OF VEHICLE

(71) Applicants: Hyundai Motor Company, Seoul (KR); Kia Motors Corporation, Seoul (KR)

(72) Inventors: Young Kwan Ko, Seoul (KR); Jun Mo An, Gyeonggi-do (KR); Woo Cheol Cho, Gyeonggi-do (KR); Soo Lim Han, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 119 days.

(21) Appl. No.: 16/662,497

(22) Filed: Oct. 24, 2019

(65) Prior Publication Data

US 2020/0346549 A1    Nov. 5, 2020

(30) Foreign Application Priority Data

May 3, 2019    (KR) .......................... 10-2019-0052241

(51) Int. Cl.
*B60L 15/20*    (2006.01)

(52) U.S. Cl.
CPC ........... *B60L 15/20* (2013.01); *B60L 2240/10* (2013.01); *B60L 2240/423* (2013.01); *B60L 2240/642* (2013.01)

(58) Field of Classification Search
CPC ............... B60L 15/20; B60L 2240/642; B60L 2240/423; B60L 2260/22; B60L 2270/145
See application file for complete search history.

(56) References Cited

U.S. PATENT DOCUMENTS

| 6,589,134 | B2 * | 7/2003 | Williams | ........ B60W 30/18054 477/99 |
|---|---|---|---|---|
| 2012/0316034 | A1 * | 12/2012 | Lim | .................... B60W 10/182 477/183 |
| 2015/0175032 | A1 * | 6/2015 | Nagamori | ........... B60L 15/2072 701/22 |
| 2017/0080946 | A1 * | 3/2017 | Fontvieille | ...... B60W 30/18054 |
| 2017/0297560 | A1 * | 10/2017 | Ko | ........................ B60W 10/08 |

FOREIGN PATENT DOCUMENTS

JP    2012-218622    * 11/2012

* cited by examiner

*Primary Examiner* — Michael J Zanelli
(74) *Attorney, Agent, or Firm* — Mintz Levin Cohn Ferris Glovsky and Popeo, P.C.; Peter F. Corless

(57) ABSTRACT

A method of controlling vibration reduction of a vehicle is capable of efficiently reducing vibration occurring when entering a P range on a ramp. The method includes: when an input to a parking range is received, determining whether or not a predetermined condition for entering a vibration reduction control mode is satisfied; when the entering condition is satisfied, calculating a motor torque for reducing vibration due to backlash by using the driving information; controlling a driving motor so as to output the calculated motor torque; controlling the parking device such that the parking range is engaged; determining whether or not a brake is released; and if the brake is released, reducing a motor torque output by the driving motor so that vibration due to the backlash is reduced.

8 Claims, 6 Drawing Sheets

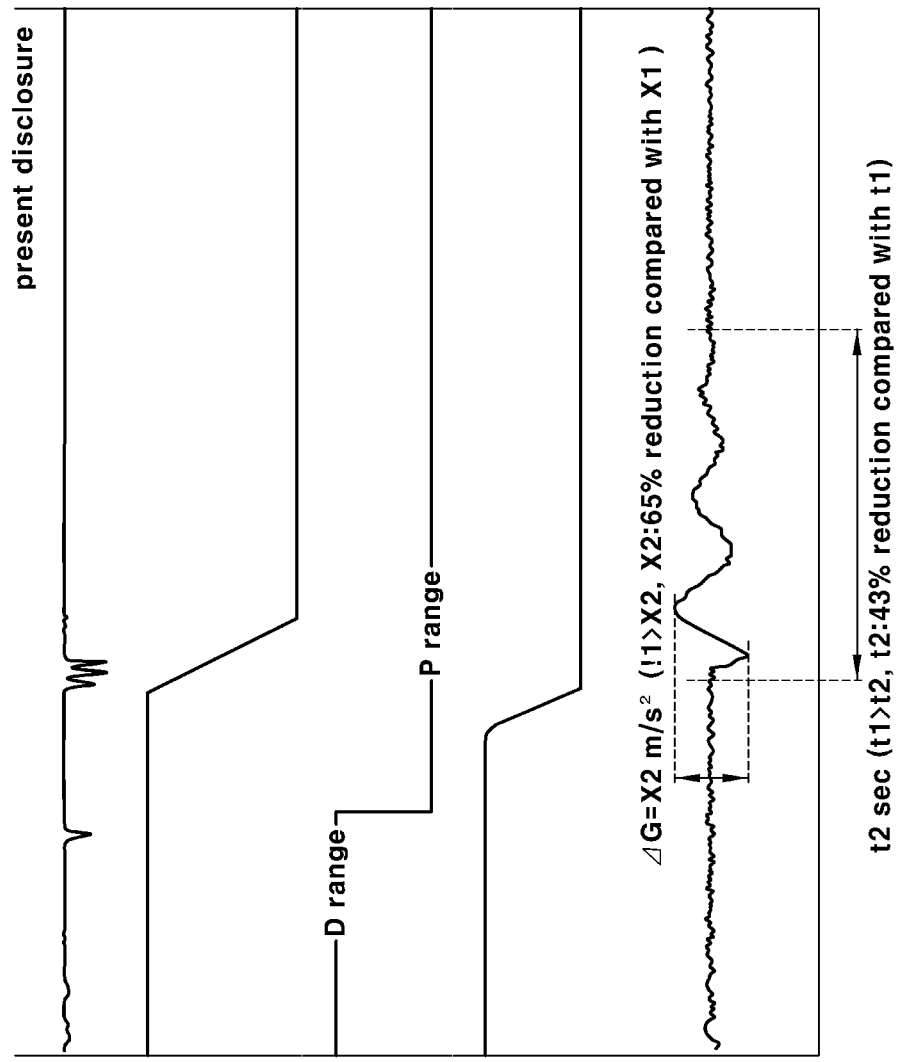

METHOD OF CONTROLLING VIBRATION REDUCTION OF VEHICLE

CROSS REFERENCE TO RELATED APPLICATION

The present application claims under 35 U.S.C. § 119(a) the benefit of Korean Patent Application No. 10-2019-0052241, filed May 23, 2019, the entire contents of which are incorporated by reference herein.

BACKGROUND

(a) Technical Field

The present disclosure relates to a method of controlling vibration reduction of a vehicle, more particularly, to the method of controlling vibration reduction of an eco-friendly vehicle, the method being capable of efficiently reducing vibration occurring when entering a parking range (P-range) on a ramp.

(b) Description of the Related Art

Generally, eco-friendly vehicles are electric vehicles that are driven with different types of electric motors. Unlike vehicles using an internal combustion engine, eco-friendly vehicles drive a motor by using electric energy stored in a battery, and are pollution-free or low-pollution vehicles that travel by transferring driving power of the motor to vehicle wheels through a power transmission device.

Such eco-friendly vehicles may include a hybrid electric vehicle (HEV), a plug-in hybrid electric vehicle (PHEV), a battery electric vehicle (BEV), etc.

An HEV is a vehicle travelling by using driving power generated by combination of an internal combustion engine and a motor; a PHEV is a vehicle designed to charge a battery of an HEV from the outside; and a BEV is a pure electric vehicle that only travels by using a battery and a motor.

Eco-friendly vehicles that operate by using a motor as described above may include: a battery storing and providing an electric energy; a motor generating driving power by converting the electric energy of the battery to a torque; an inverter driving and controlling the motor; a charging device for charging the battery and motor; a transmission shifting the driving power and transferring the same to driving wheels; and a parking device for fixing the vehicle at the time of parking.

In eco-friendly vehicles, an automatic transmission is widely used as a transmission, and the automatic transmissions are classified according to a shift mode into an automatic transmission equipped with a mechanical transmission lever which shifts in a mechanical link structure through a wire, and an automatic transmission equipped with a shift by wire (SBW) that shifts by using electrical signals instead of a mechanical link structure.

Unlike a mechanical transmission lever system, an SBW is a system that transfers transmission information selected by a driver in an electric signal without using a mechanical link between a transmission and a transmission lever.

In addition, a general vehicle equipped with an automatic transmission is provided with a parking device for maintaining a stopping state of the vehicle by locking a parking gear that is fixedly installed in a driving shaft in a parking range (P-range).

In a parking device of a vehicle, when a transmission lever moves from a driving range (D range) to a parking range (hereinafter, referred as "P range"), a parking rod operating in association thereto operates a parking sprocket, and then the parking sprocket locks a parking gear by being engaged between teeth of the parking gear. Accordingly, vehicle wheel rotation is disabled when the parking gear is locked as provided above.

Meanwhile, when a transmission lever of a vehicle enters a P range, the parking sprocket has to be engaged with the parking gear so as to lock the parking gear. However, when backlash is present between the teeth of the parking gear and the parking sprocket, the teeth of the parking gear and the parking sprocket may not be engaged mechanically.

In particular, when the parking sprocket and the parking gear are not mechanically engaged due to backlash on a ramp and a brake is released, the vehicle is pushed downward from the ramp due to backlash while the parking sprocket and the parking gear become engaged. Herein, vehicle vibration occurs as the kinetic energy is transferred to the vehicle.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a method of controlling vibration reduction of a vehicle, the method being capable of efficiently reducing vibration occurring when entering a P range on a ramp.

In order to achieve the above object, according to one aspect of the present disclosure, there is provided a method of controlling vibration reduction of a vehicle, the method including: determining, by a controller, whether or not an input for switching to a parking range is received; if the input is received, determining, by the controller, whether or not a predetermined condition for entering a vibration reduction control mode is satisfied by using driving information collected in the vehicle; when the predetermined condition is satisfied, calculating, by the controller, a motor torque for reducing vibration due to backlash in a parking device by using the driving information; controlling, by the controller, a driving motor so as to output the calculated motor torque; controlling, by the controller, the parking device such that the parking range is engaged; determining, by the controller, whether or not a brake is released; and if the brake is released, decreasing, by the controller, a motor torque output by the driving motor so that vibration due to the backlash is reduced.

Herein, in the determining of whether or not the condition for entering the vibration reduction control mode is satisfied, the driving information may include information of a vehicle velocity and a slope angle of a road where the vehicle is located, and the condition for entering the vibration reduction control mode may include a vehicle velocity condition for the vehicle that is stationary, and a road condition of whether or not the slope angle of the road is greater than or equal to a preset level.

In addition, in the calculating of the motor torque, the driving information may include a slope angle of a road where the vehicle is located, and the motor torque may be calculated by using the slope angle of the road, and unique set information of the vehicle.

Herein, the unique set information of the vehicle may include: a tire radius; a vehicle weight; and a gear ratio between the motor in a driving range before receiving the parking range input, and drive wheels.

Herein, the motor torque may be calculated by using Formula 1 below, $$TQ_{mot} = \frac{r \cdot m \cdot g \cdot \sin\theta}{\eta} \quad \text{Formula 1}$$

(wherein, $TQ_{mot}$ is a motor torque for vibration reduction, r is a tire radius, m is a vehicle weight, and η is a gear ratio between a motor in a driving range before receiving the parking range input and drive wheels, g is gravitational acceleration, and θ is a slope angle of a road).

In addition, in the performing control of the driving motor, the controller may set the calculated motor torque as a target value, and gradually increase the motor torque of the driving motor in a predetermined slope until the motor torque output from the driving motor reaches the set target value.

In addition, in the decreasing of the motor torque output from the driving motor, the controller may decrease the torque output from the driving motor in a predetermined slope to be a motor torque released state.

In addition, in the determining of whether or not the brake is released, the controller may determine that the brake is actually released after elapsing a predetermined set time from a point of time at which the brake release input is received from the driver.

Accordingly, according to a method of controlling vibration reduction of a vehicle of the present disclosure, when the parking sprocket and the parking gear, which are not mechanically engaged due to backlash after an input to a P range is received, are mechanically engaged when the brake is released, the kinetic energy transferred by using the motor torque becomes minimum, and thus vehicle vibration due to the backlash of the parking device can be effectively reduced.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 5A and 5B are views showing effects of vibration reduction control according to the present disclosure.

DETAILED DESCRIPTION OF THE DISCLOSURE

Figure 1:
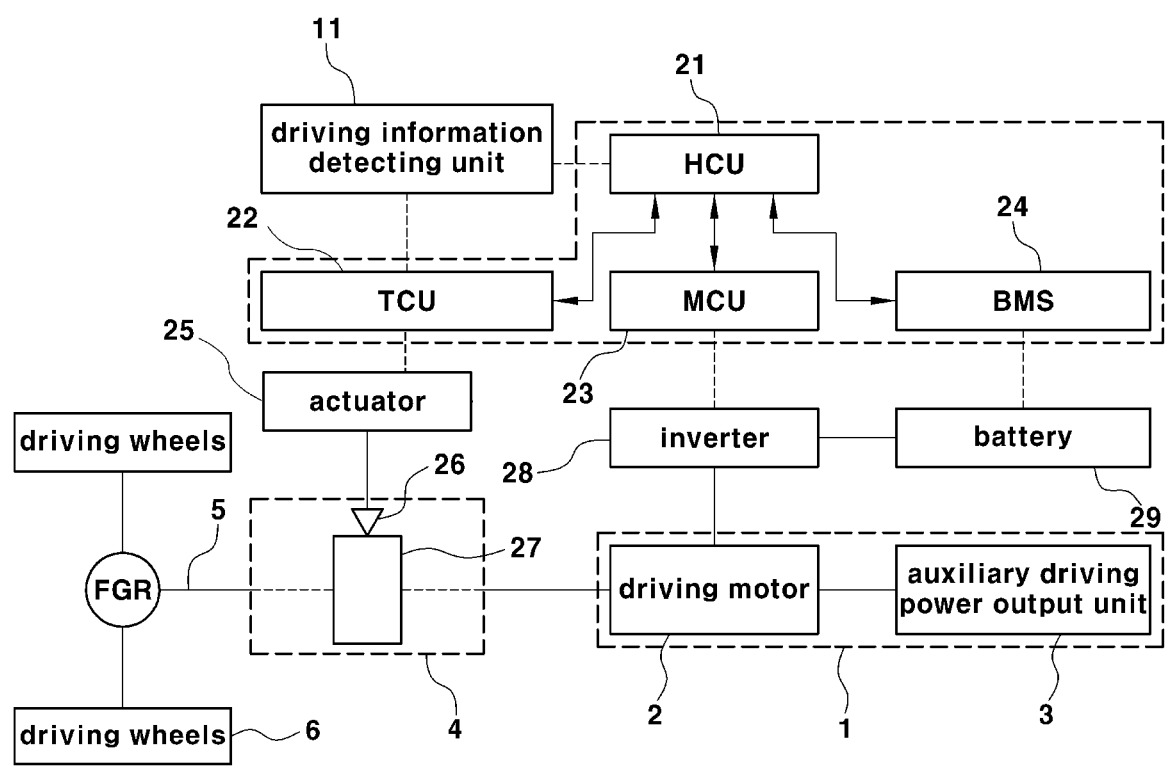
FIG. 1 is a configuration diagram of a system where a method of controlling vibration reduction according to the present disclosure is performed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings so that those skilled in the art can easily carry out the present disclosure. However, the present disclosure is not limited to the embodiments described herein but may be embodied in other forms.

The present disclosure relates to a method of controlling vibration reduction of a vehicle, and to a method of reducing vehicle vibration due to backlash of a parking device when a brake is released after entering a P range on a ramp.

Particularly, the present disclosure may be applied to vehicles equipped with a shift by wire (SBW) and to eco-friendly vehicles such as, for example, pure electric vehicles (BEV), hybrid vehicles (HEV, PHEV), etc., and the present disclosure is to provide a method of efficiently reducing vibration generated when a vehicle rolls downhill due to backlash between a parking sprocket and a parking gear when a brake is released after entering a P range on a ramp.

According to the present disclosure, when a vehicle rolls, by using a torque of a driving power source of a vehicle, particularly, a torque of a motor that is the driving power source of the vehicle, the vehicle is controlled to roll slowly, and thus vibration occurring in the vehicle is reduced by reducing the kinetic energy transferred to the vehicle.

For example, in the present disclosure, vibration is reduced by controlling the driving motor when the vehicle enters a P range on a ramp and then a brake is released.

FIG. 1 is a configuration diagram of a system where vibration reduction control according to the present disclosure is performed.

As shown in FIG. 1, a vehicle is provided with: a driving power generating device 1 for driving the vehicle; a transmission 4 connected to an output of a motor; an inverter 28 for driving and controlling a driving motor 2; and a battery 29 connected to the driving motor 2 via the inverter 28 in a chargeable manner.

The inverter 28 is a kind of power conversion device that converts direct current (DC) current of the battery 29 into three-phase alternating current (AC) current, and applies the same to the motor 2 for driving the same.

In a vehicle using the driving motor 2 as a vehicle driving power source, a regeneration mode is performed in which the battery is charged by recovering the kinetic energy of the vehicle through the motor when the vehicle is coasting due to braking or inertia.

In a regeneration mode, the motor 2 receives the kinetic energy of the vehicle through drive wheels 6 and a drive shaft 5. Herein, the motor 2 operates as a generator so that the battery 29 is charged through the inverter 28.

In addition, a motor control unit (MCU) 23 operating and controlling the driving motor 2 through the inverter 28, and a battery management system (BMS) 24 collecting, using, and providing state information of the battery 29, and performing battery control are also provided. In addition, as a controller within a vehicle, a hybrid control unit (HCU) or vehicle control unit (VCU) 21, and a transmission control unit (TCU) 22, etc. are provided.

An auxiliary driving power output unit 3 of FIG. 1 is a device provided in the driving power generating device 1 in addition to the driving motor 2 that is for vehicle driving power. For example, the same may be configured with an engine and an engine clutch in a hybrid vehicle. The engine is used as a vehicle power source with the motor, and the engine clutch is provided between the engine and the motor, and couples or separates the engine and the motor by being selectively engaged or released so that driving power is transferred between the engine and the motor.

The transmission 4 shifts the motor power or the combined power of the engine and the motor, and transfers the same to the drive wheels 6 through the driving shaft 5, and includes a parking gear 27 installed in the driving shaft 5.

The parking gear 27 is selectively locked or released by a parking sprocket 26. An SBW possibly controlling the parking sprocket 26 in an electric manner may be provided in the vehicle.

The SBW may include an actuator 25 that selectively locks or releases the parking sprocket 26 to/from the parking gear 27, and the actuator 25 may be provided to be controlled by a control signal of the TCU 22.

In addition, the TCU 22 determines a state of a transmission lever manipulated by a driver by receiving a signal of a transmission detecting unit detecting a position of the transmission lever of a vehicle driving information detecting unit 11.

Figure 2:
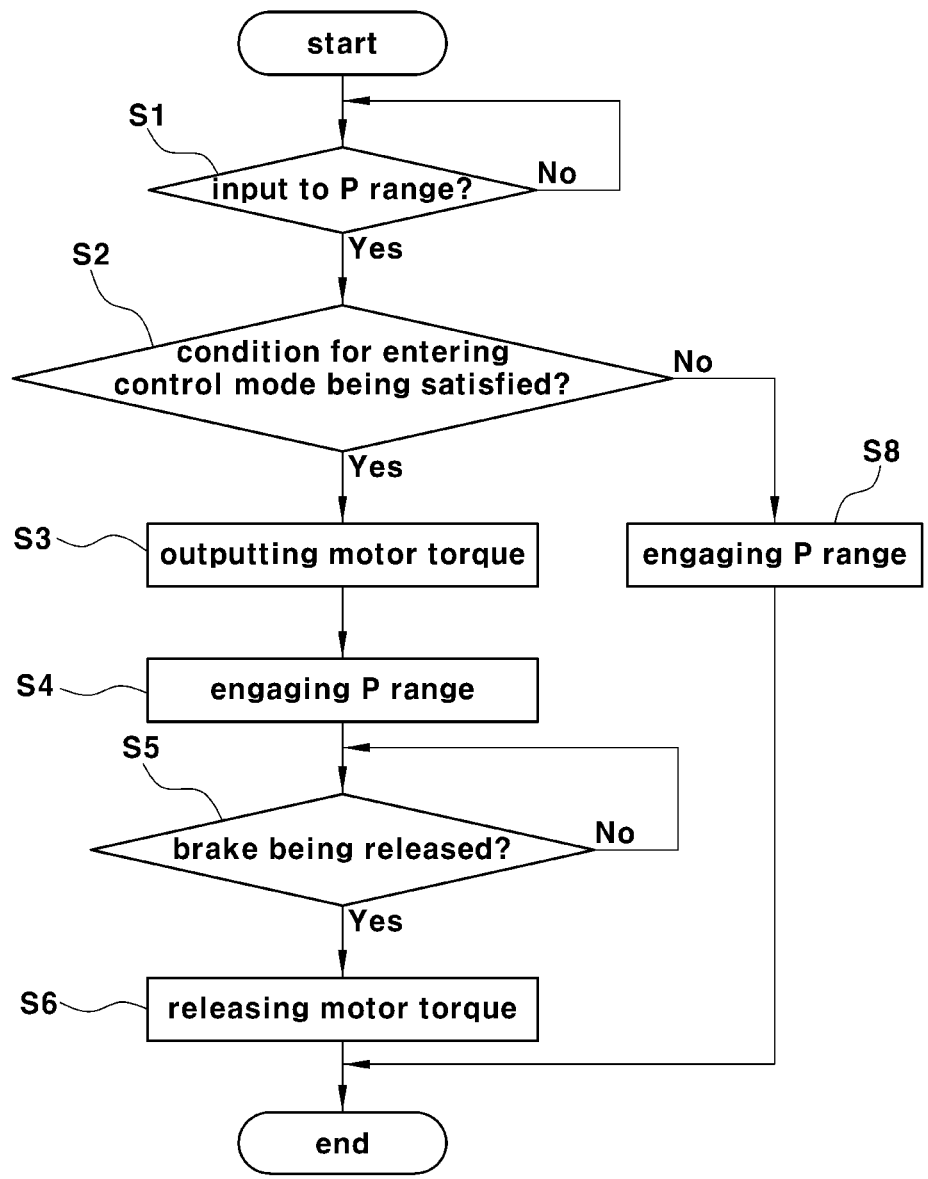
FIGS. 2 and 3 are views of a flowchart respectively showing a method of controlling vibration reduction according to an embodiment of the present disclosure.
Figure 3:
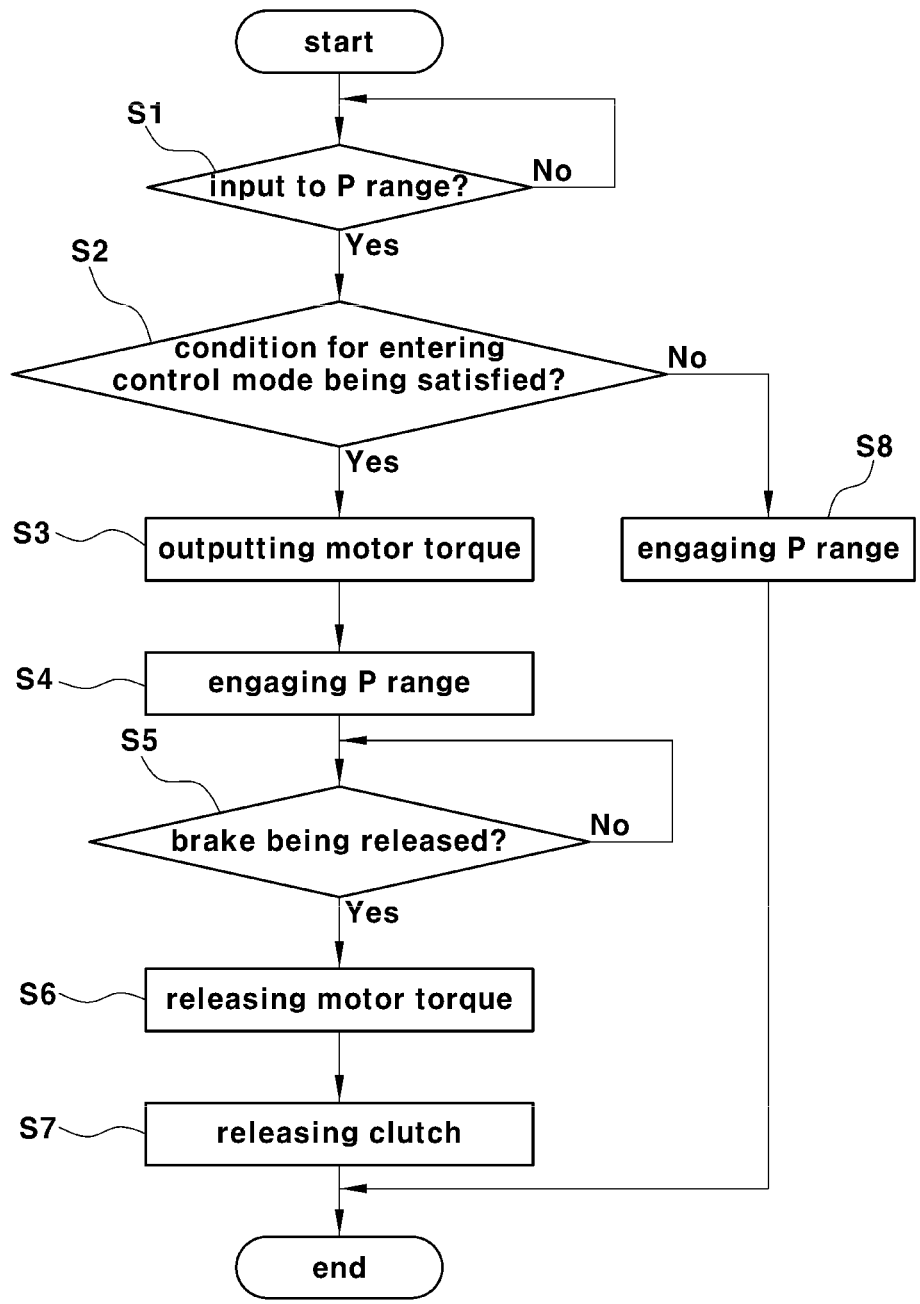

Meanwhile, FIGS. 2 and 3 are views respectively showing a method of controlling vibration reduction according to an embodiment of the present disclosure, FIG. 2 shows a process of controlling vibration reduction in a vehicle where a clutch is not provided in a transmission, and FIG. 3 shows a process of controlling vibration reduction in a vehicle where a clutch is provided in a transmission.

Figure 4:
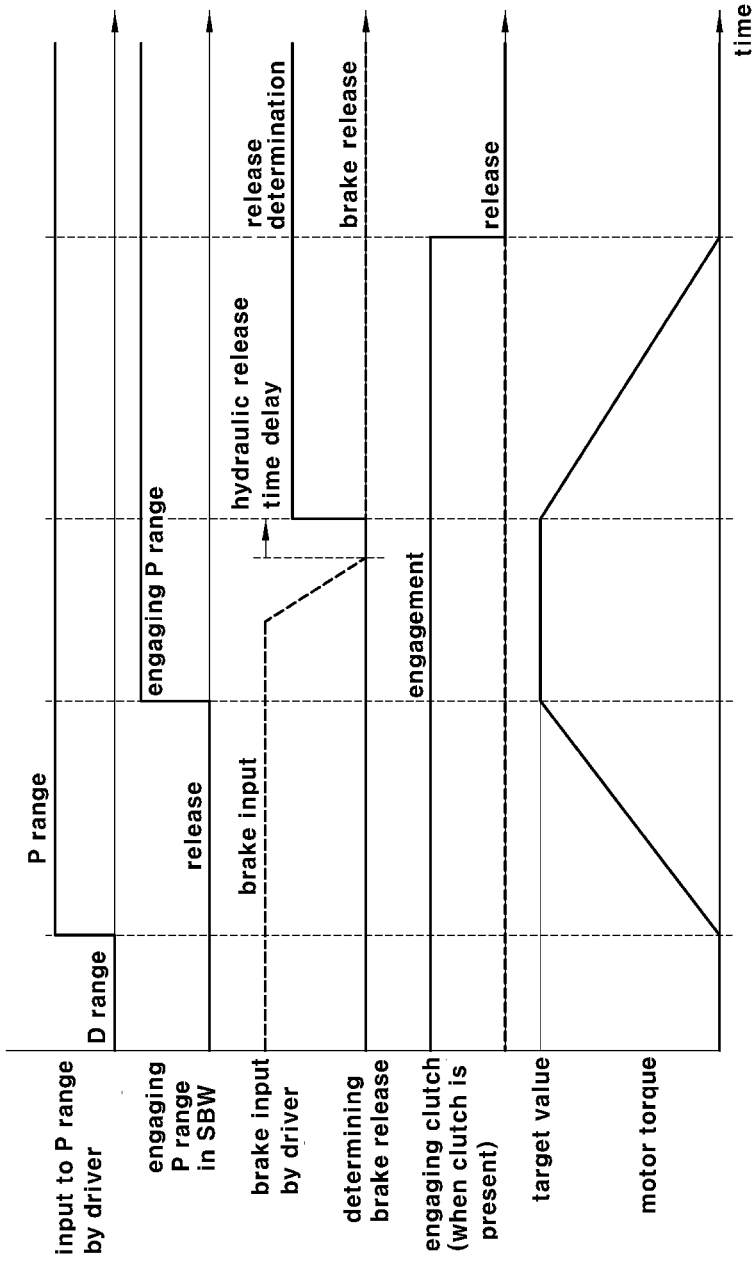
FIG. 4 is a view showing a control operation diagram of vibration reduction according to an embodiment of the present disclosure.

In addition, FIG. 4 is a view showing an operation diagram of vibration reduction control according to an embodiment of the present disclosure.

A process of controlling vibration reduction, which will be described below, may be performed by a controller within a vehicle, and may be performed by the plurality of controllers shown in FIG. 1 in a cooperative control manner, or may be performed by a single integrated controller.

In the below description, the plurality of controllers or single integrated controller which performs the process of controlling vibration reduction according to the present disclosure will be referred to as a "controller".

In the present disclosure, a control process varies according to whether or not a clutch is present, which selectively transfers driving power in a driveline, such as a clutch (not shown) provided between the driving motor 2 and the parking gear 27 within the transmission 4.

First, a process of controlling vibration reduction in a vehicle where a clutch is not provided will be described below with reference to FIGS. 2 and 4.

In step S1, the controller determines whether or not a driver has switched the transmission lever to a P range by using a signal of the transmission detecting unit that detects a position of the transmission lever of the driving information detecting unit 11.

In other words, the controller determines whether or not an input for switching to the P range by the driver is received, and if the input is received, a vibration reduction control mode is entered.

Herein, when it is determined that the driver has switched the transmission lever to the P range, in step S2, in the SBW, the P range is not actually immediately engaged (engaging the parking sprocket to the parking gear), and whether or not a predetermined condition for entering a vibration reduction control mode is satisfied is determined.

As the condition for entering the vibration reduction control mode, the condition may include a vehicle velocity condition for the vehicle that is stationary, and a condition of a road where a slope angle of the road is greater than or equal to a set level (uphill road and downhill road).

In order to determine whether or not the condition is satisfied, the driving information detecting unit 11 may further include, in addition to the transmission detecting unit, a vehicle velocity detecting unit and a slope angle determining unit. The driving information detecting unit 11 determines whether or not the vehicle is stopped by using a signal of the vehicle velocity detecting unit.

In addition, a slope angle of the road on which the vehicle is currently stopped is obtained by driving information collected in the slope angle determining unit, and whether or not the obtained slope angle of the current road is greater than or equal to a preset level is determined.

As is known, there are uphill roads (ascent roads) and downhill roads (descent roads), and the uphill roads and the downhill roads may differ in sign of a slope angle between positive (+) and negative (−) values.

Accordingly, when a slope angle of a road is greater than or equal to a preset level, it means that an absolute value of the slope angle is greater than or equal to a preset level, that is, "A1>slope angle" or "A2<slope angle" (herein, A1 and A2 are positive values).

Generally, various methods are known for obtaining a slope angle of a road in a vehicle, and the slope angle of the road on which the vehicle is located is a control parameter widely used in vehicle control. Accordingly, in the present disclosure, detailed description of a method of obtaining the slope angle of the road in the vehicle will be omitted.

In the present disclosure, a vibration reduction control mode may be set to be entered when the controller determines that the entering condition is satisfied, and vibration reduction control may be set not to be performed when the vehicle is not stopped or a slope angle of a road is smaller than a set level.

In other words, when a condition for entering a vibration reduction control mode is not satisfied, in step S8, the controller does not output a motor torque for vibration reduction. Herein, the controller performs control for engaging the P range.

Herein, engaging the P range means that the actuator 25 operates according to a control signal of the controller, the parking sprocket 26 operates by the actuator 25, and the parking sprocket 26 is engaged with teeth of the parking gear 27, thus the parking gear becomes actually locked.

As a result, when the P range engagement is performed by the controller, the parking gear on the driving shaft cannot rotate by being in a locked state, and thus the vehicle wheels are restrained. Accordingly, rotation of the vehicle wheels is impossible and the vehicle enters a fixed state.

However, when the entering condition is satisfied in step S2, a vibration reduction control mode is entered, and in the vibration reduction control mode, the controller calculates a motor torque, and outputs a torque reference corresponding to the calculated motor torque.

Herein, the motor torque ($TQ_{mot}$) is calculated by using the slope angel and unique set information of the vehicle, and a formula for calculating the same is provided in Formula 1 below.

$$TQ_{mot} = \frac{r \cdot m \cdot g \cdot \sin\theta}{\eta} \quad \text{[Formula 1]}$$

Herein, $TQ_{mot}$ represents a motor torque for vibration reduction when entering a P range.

In addition, r, m, η are unique set information of a vehicle and used for calculating a motor torque by being input in advance and stored in the controller, where r is a tire radius, m is a vehicle weight, and η is a gear ratio between the motor (driving motor) and the drive wheels.

Herein, the gear ratio is a gear ratio corresponding to a driving state (D range) immediately before receiving the P range input.

In addition, g is gravitational acceleration, and θ is a slope angle determined in the slope angle determining unit of the driving information detecting unit 11, that is, a slope angle of a road on which the vehicle is currently located.

When the motor torque is calculated as provided above, in step S3, the controller performs control of applying the calculated motor torque.

In other words, the controller generates and outputs a torque reference corresponding to the calculated motor torque, and controls operation of the motor so as to output a torque corresponding to the torque reference.

Herein, when the motor is controlled to output the calculated torque at one time, impact and vibration due to a torque difference may occur in the vehicle. Accordingly, the present disclosure performs control of gradually changing the torque output from the motor when applying the motor torque.

In particular, the controller sets the calculated motor torque as a target value, and performs control of increasing the torque actually output by the motor in a predetermined slope until the target value is reached.

When the motor outputs a torque of the target value by gradually increasing the output torque as provided above, that is, when the torque output from the motor reaches the calculated motor torque, in step S3, the controller performs control of engaging the P range.

When the P range engagement is performed by the controller as provided above, the controller determines whether or not an input for a brake release is received. In particular, the driving information detecting unit 11 further includes a brake detecting unit.

Herein, the brake detecting unit may be a general brake pedal sensor (BPS) installed in a vehicle.

The controller may determine a brake state manipulated by the driver by using a signal of the brake detecting unit (that is, BPS signal), and in step S5, the controller determines whether or not a brake pedal is released by using a signal of the brake detecting unit after engaging the P range.

In other words, whether or not a brake release input by the driver is received is determined, and the controller may determine that a brake release input is received when a signal value of a received BPS signal is less than or equal to a reference value.

In addition, after receiving a brake release input by a driver, a time delay may occur until an actual hydraulic pressure is released and then the brake is released. Accordingly, the controller determines that the brake is actually released after elapsing a predetermined set time from a point of time at which the brake release input is received.

After determining whether or not a brake is released as provided above, in step S6, the controller stops outputting the motor torque that has been output for vibration reduction when entering the P range.

When stopping of outputting the motor torque, the motor torque is slowly decreased until reaching a release state, that is, zero torque state ($TQ_{mot}=0$ Nm). Herein, the motor torque is decreased in a predetermined slope which causes the vehicle to slowly roll on the current road that is a ramp.

In addition, when the motor torque reaches a release state, vibration reduction control is completed.

In the present disclosure, a torque increasing slope for applying a motor torque for vibration reduction, and a torque decreasing slope for the motor torque may be set to appropriate values through preliminary evaluation and testing for the vehicle of the same specification, and may be suitably tuned according to the vehicle condition.

Meanwhile, in case of a vehicle where a clutch is present between a motor and a parking gear, normally, driving power is not transferred by releasing the clutch when engaging a P range.

However, in the present disclosure, a motor torque for vibration reduction is output before and after engaging a P range, and the motor torque has to be transferred to a parking gear through a driving shaft. Accordingly, a clutch does not need to be released while the motor torque for vibration reduction is output.

Accordingly, as shown in FIG. 3, in a vehicle provided with a clutch, the controller of the present disclosure maintains the clutch in an engaged state while vibration reduction control is performed rather than releasing the clutch, and the controller releases the clutch when vibration reduction control is completed.

In other words, the clutch is released after receiving a P range input by the driver, applying a motor torque, engaging the P range, receiving a brake release by the driver, and stopping outputting the motor torque.

Figure 5A:
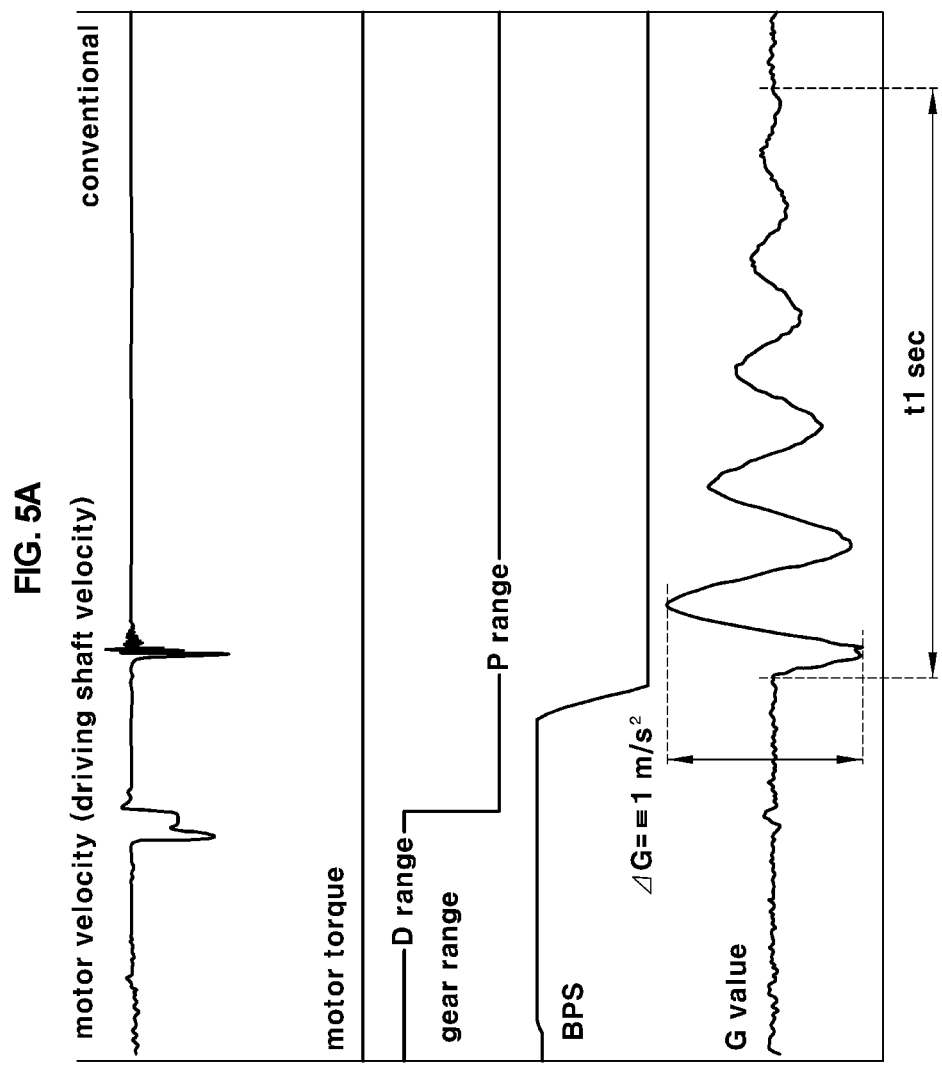

FIGS. 5A and 5B are views showing effects of vibration reduction control according to the present disclosure, and showing that vibration reduction effect is present in the present disclosure when input to the P range input is received from the driver during a ramp-up process.

FIG. 5A is a view showing a conventional vehicle state where vibration reduction control according to the present disclosure is not applied, and FIG. 5B is a view showing a vehicle state where vibration reduction control according to the present disclosure is applied. Herein, an amplitude of a G value signal represents a size of vehicle vibration.

Referring to FIG. 5B, when performing vibration reduction control according to the present disclosure, engagement from the driving range (D range) to the parking range (P range) is actually performed under a state where the motor torque is increased. Subsequently, when the brake is released by the driver, the motor torque is decreased.

Accordingly, a magnitude of vibration and the time of occurrence of vibration in the vehicle are greatly reduced compared with the conventional case.

In particular, according to a method of controlling vibration reduction according to the present disclosure, when the parking sprocket and the parking gear, which are not mechanically engaged due to backlash after an input to a P range is received, are mechanically engaged when the brake is released, the kinetic energy transferred by using the motor torque becomes minimum, and thus vehicle vibration due to the backlash of the parking device is effectively reduced.

The vibration problem due to backlash when entering the P range in the above-mentioned ramp is a problem occurring in conventional vehicles using an internal combustion engine. In vehicles using an internal combustion engine, vibration can be reduced with structural improvements. However, in eco-friendly vehicles, vibration can be reduced by using a motor without structural improvements since the driving motor can be actively controlled.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling vibration reduction of a vehicle, the method comprising:
   determining, by a controller, whether or not an input for switching to a parking range is received;
   if the input is received, determining, by the controller, whether or not a predetermined condition for entering a vibration reduction control mode is satisfied by using driving information collected in the vehicle;
   when the predetermined condition is satisfied, calculating, by the controller, a motor torque for reducing vibration due to backlash in a parking device by using the driving information;
   controlling, by the controller, a driving motor so as to output the calculated motor torque;
   controlling, by the controller, the parking device such that the parking range is engaged;
   determining, by the controller, whether or not a brake is released; and
   if the brake is released, decreasing, by the controller, a motor torque output by the driving motor so that vibration due to the backlash is reduced.

2. The method of claim 1, wherein in determining whether or not the condition for entering the vibration reduction control mode is satisfied,
   the driving information includes information of a vehicle velocity and a slope angle of a road where the vehicle is located, and
   the condition for entering the vibration reduction control mode includes a vehicle velocity condition for the vehicle that is stationary, and a road condition of whether or not the slope angle of the road is greater than or equal to a preset level.

3. The method of claim 1, wherein in calculating the motor torque, the driving information includes a slope angle of a road where the vehicle is located, and the motor torque is calculated by using the slope angle of the road, and unique set information of the vehicle.

4. The method of claim 3, wherein the unique set information of the vehicle includes: a tire radius; a vehicle weight; and a gear ratio between the motor in a driving range before receiving the parking range input, and drive wheels.

5. The method of claim 4, wherein the motor torque is calculated by using Formula 1 below, $$TQ_{mot} = \frac{r \cdot m \cdot g \cdot \sin\theta}{\eta} \quad \text{Formula 1}$$

(wherein $TQ_{mot}$ is the motor torque for vibration reduction, r is the tire radius, m is the vehicle weight, and $\eta$ is the gear ratio between the motor in the driving range before receiving the parking range input and the drive wheels, g is gravitational acceleration, and $\theta$ is the slope angle of the road).

6. The method of claim 1, wherein in controlling the driving motor, the controller sets the calculated motor torque as a target value, and gradually increases the motor torque of the driving motor in a predetermined slope until the motor torque output from the driving motor reaches the set target value.

7. The method of claim 1, wherein in decreasing the motor torque output from the driving motor, the controller decreases the torque output from the driving motor in a predetermined slope to be a motor torque released state.

8. The method of claim 1, wherein in determining whether or not the brake is released, the controller determines that the brake is actually released after elapsing a predetermined set time from a point of time at which the brake release input is received from the driver.

* * * * *